UNITED STATES PATENT OFFICE.

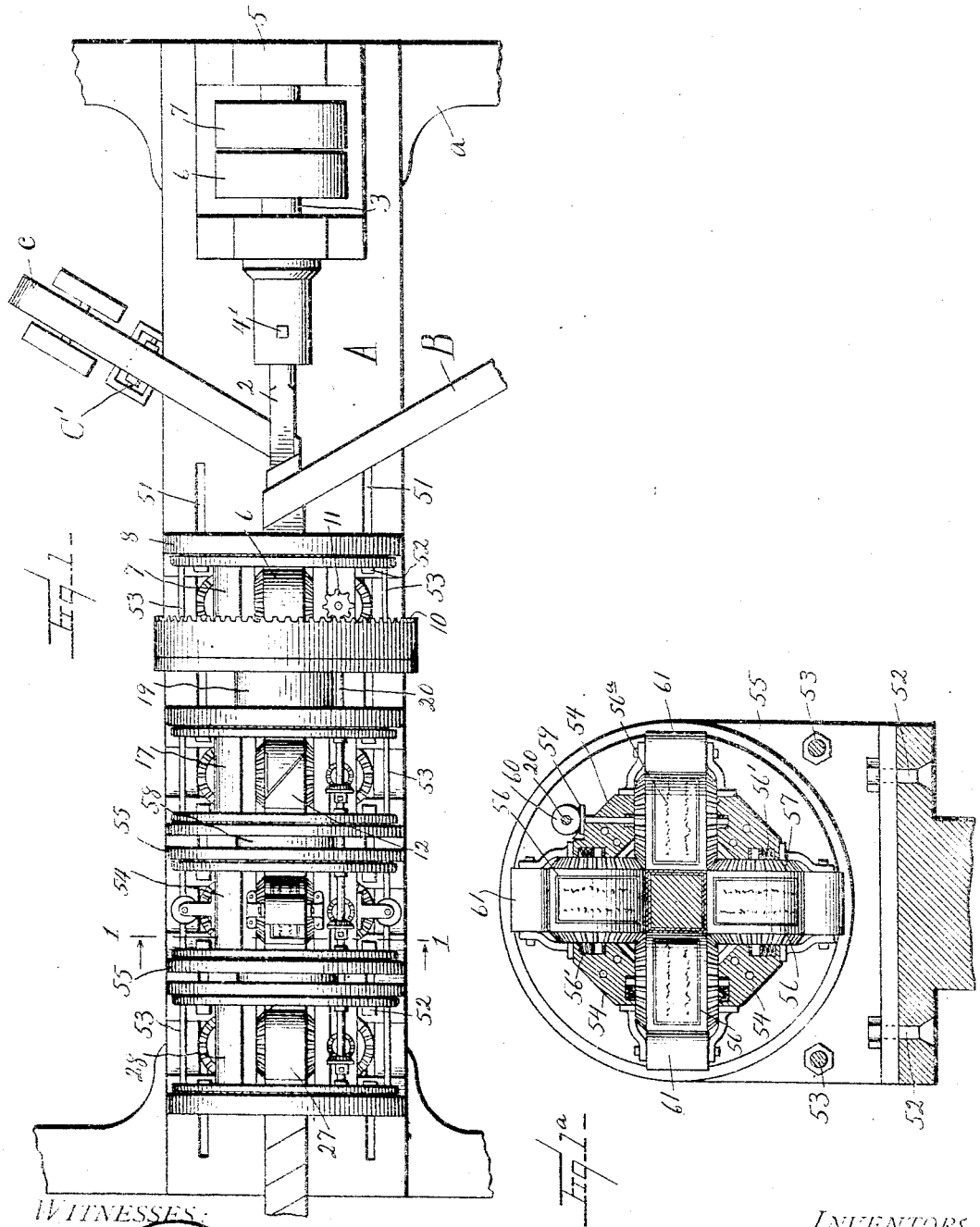

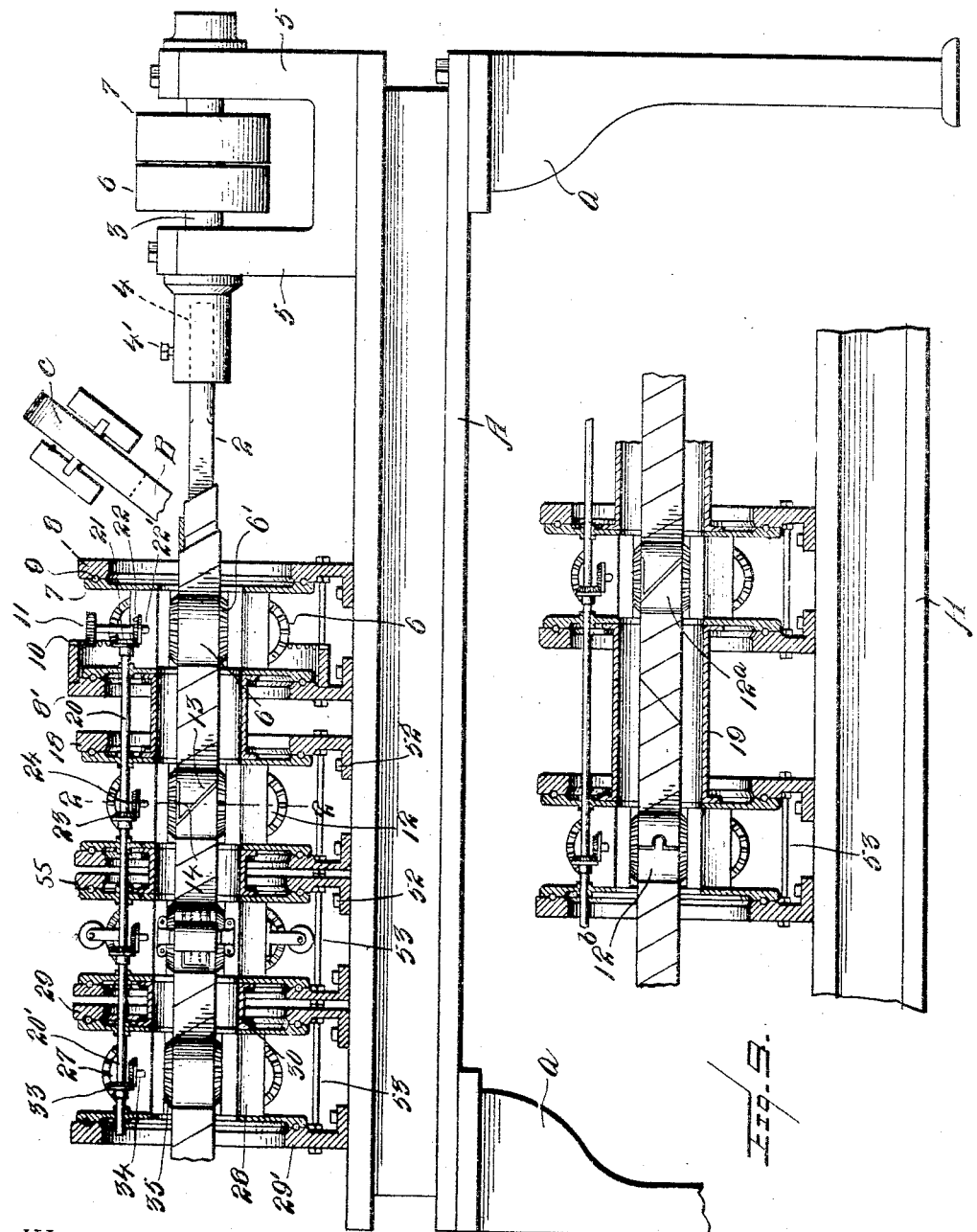

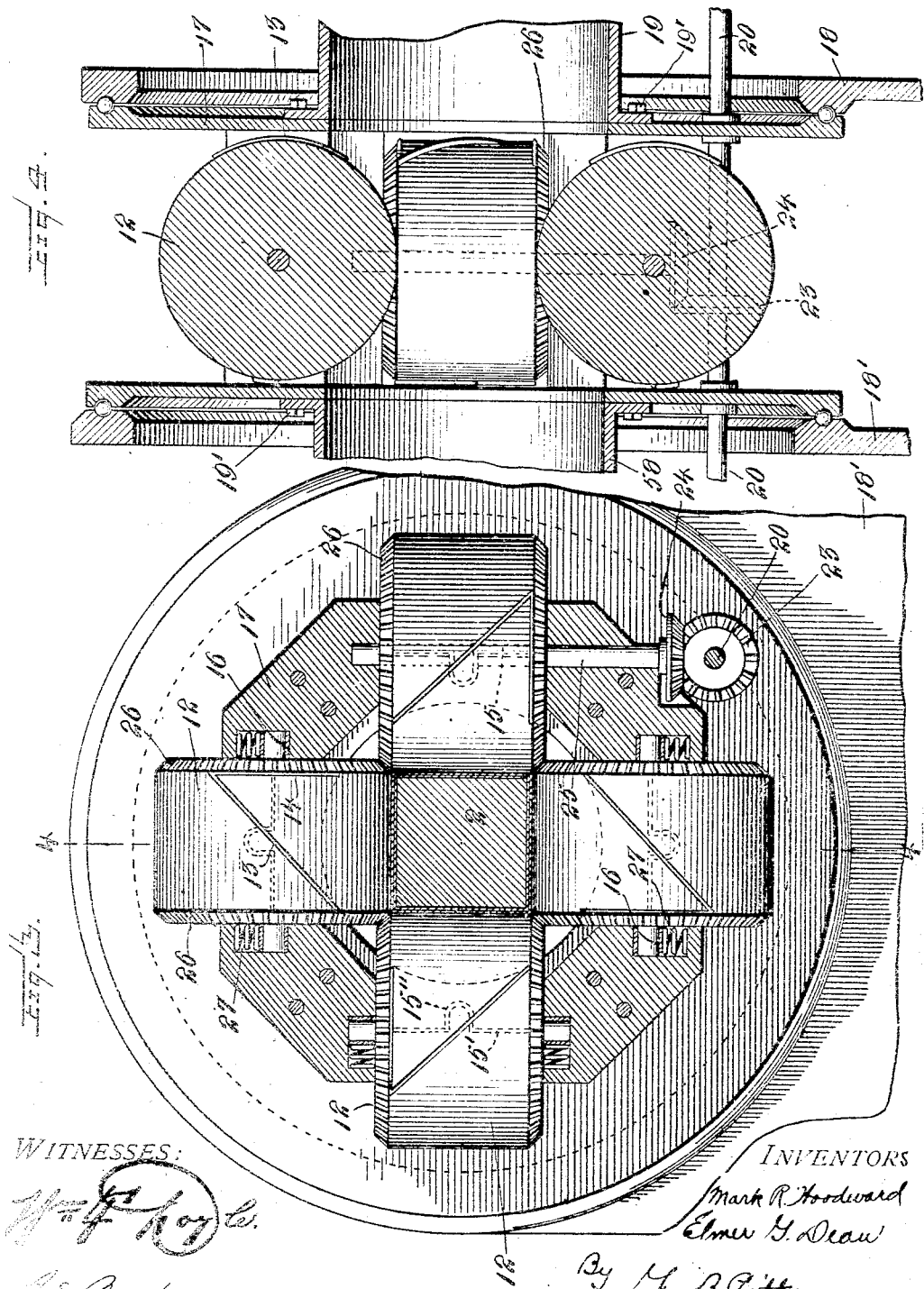

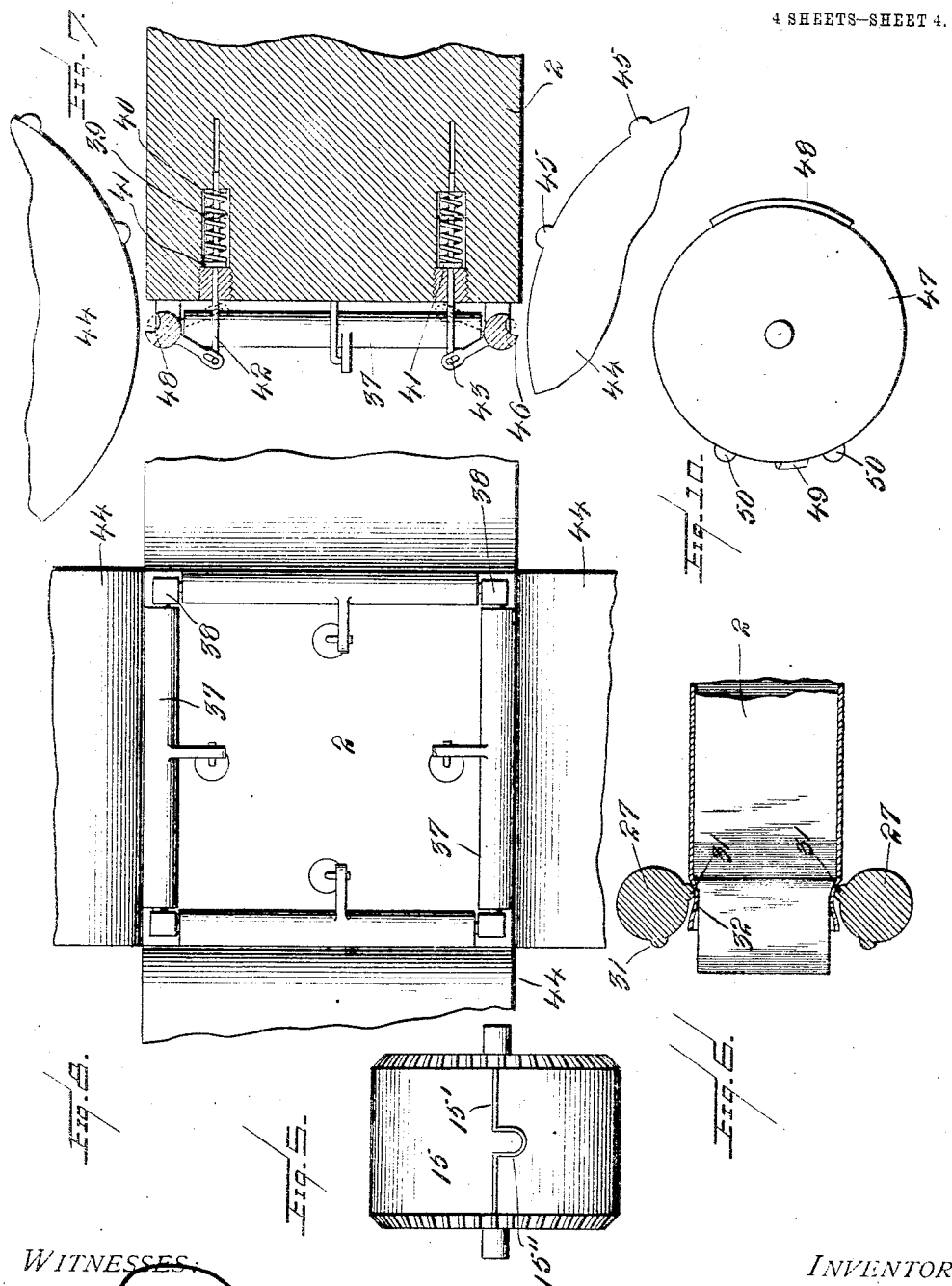

MARK R. WOODWARD, OF WASHINGTON, DISTRICT OF COLUMBIA, AND ELMER G. DEAN, OF NIAGARA FALLS, NEW YORK, ASSIGNORS TO AUTOMATIC LIQUID BOX COMPANY, OF NIAGARA FALLS, NEW YORK, A CORPORATION OF NEW YORK.

BOX-MACHINE.

1,055,007.   Specification of Letters Patent.   Patented Mar. 4, 1913.

Application filed August 27, 1908. Serial No. 450,425.

*To all whom it may concern:*

Be it known that we, MARK R. WOODWARD and ELMER G. DEAN, citizens of the United States, and residing at Washington, District of Columbia, and Niagara Falls, county of Niagara, State of New York, respectively, have invented new and useful Improvements Relating to Box-Machines, of which the following is a specification.

Our invention relates to a machine for making boxes from tubes formed of flexible material such as paper.

One object of the invention is to provide means for severing a tube into lengths or sections each of which is provided with flaps or projections at one or both ends without waste of material.

Another object of the invention is to combine with tube forming mechanism cutting mechanism adapted to sever the tube into sections with tabs or flaps at one or both ends thereof.

Another object of the invention is provide means for printing or embossing one or more surfaces of the tube or box formed therefrom.

A further object of the invention is to provide means for constricting one or both ends of each section or box blank to form a seat for a closure.

The apparatus herein described and claimed relates particularly to the machine shown and described in an application filed by Elmer G. Dean, on Feb. 21, 1908, Serial No. 417,171.

We have elected to show in the drawings accompanying this application mechanism for forming and cutting a tube of polygonal shape in cross section. It will be understood, however, that our invention is not limited to this particular form but may be changed and adapted to form tubes of cylindrical or elliptical shape, and of different sizes as set forth in the aforesaid application, whenever desired, and to form such tubes into boxes or receptacles.

Referring to the drawings: Figure 1 is a plan view of a machine embodying our invention. Fig. 1ª is a cross section on line 1—1, Fig. 1. Fig. 2 is an elevation of the machine, parts thereof being in section. Fig. 3 is a transverse section on line 2—2, Fig. 2. Fig. 4 is a sectional view on line 4—4, Fig. 3. Fig. 5 is an elevation of one of the cutters. Fig. 6 is a view of the mechanism at the end of the former for constricting the end of a tube section. Fig. 7 is a different form of the constricting mechanism from that shown in Fig. 6. Fig. 8 is an end view of Fig. 7, parts being broken away. Fig. 9 is a modification of the invention for severing the tube. Fig. 10 illustrates another form of the tube severing and constricting mechanism.

In the drawings, A indicates a frame or bed suitably supported on legs $a$.

2 indicates a mandrel or former around which a strip or strips of flexible material B may be wound to form the tube, one web of material from which a strip is drawn being shown at $c$. The former 2 is supported at one end by a shaft 3, which is preferably provided with a socket 4 to receive the former and a set screw 4' to properly secure it in place. The shaft is supported in bearings in the standards 5, 5. Any suitable means may be provided for driving the former. One example of such means comprises fast and loose pulleys $6^a$, $7^a$, respectively, mounted on the shaft 3 between the standards 5.

The mechanism for forming the tube upon the former comprises a series of pressers 6, 6, rotatably mounted in a frame 7. This frame is rotatably mounted between bearing plates 8, 8', whereby the pressers 6 may be revolved around the longitudinal axis of the former 2.

9 indicates ball bearings to reduce the friction between the presser-carrying frame and the said plates.

The pressers 6 surround the former on all its sides and each is adapted to engage with a portion of its peripheral surface, so that the strip or strips of material which are fed between the pressers and the former, are pressed against the sides thereof and thus shape the material into a tube. The pressers 6 are preferably revolved by the former, such operation being effected by reason of their engagement with or position relative to the adjacent surfaces thereof.

Rotation may be given to each presser 6 in order to feed the tube along the former, at the same time it revolves with the former by providing one of the plates, 8', with a curved rack 10 with which meshes a gear 11, mounted on a shaft that is connected directly or by gears with one of the pressers. Each presser is provided with cogs 6' at its opposite ends that engage with similar cogs on the ends of the adjoining pressers, whereby they are all rotated together or simultaneously.

12, 12 indicate a series of cutters surrounding the former and preferably comprising rollers provided with knives for severing the tube that is fed along the former into sections on lines that leave flaps on the adjoining ends of two sections. These knives may be of different shapes to form flaps of different sizes and contours that may be best suited to the use to which the box will be put. But as will be seen from the following description, the cutters coöperate to cut the tube on a single irregular or zigzag line which forms projections on one end of one section and a depression corresponding to said projection on the adjacent end of the adjoining section. As a result the end or ends of each section are provided with a series of projections which form the flaps or end wall or walls therefor. One form of such cutting knives comprises a diagonal knife 13 and a longitudinal knife 14, two such knives being mounted on each of the rollers 12 and forming a cutting device substantially V-shaped. By this construction the tube is severed on lines that leave flaps on both of the adjoining ends, which flaps may be bent down upon each other and form a closure for the sections or box blanks cut.

Another form of cutting means comprises knives 15 (see Figs. 3 and 5) each having straight edges 15', 15' and a U-shaped edge 15" which form the flaps on the tube sections. In this form of the invention, the cutting means may be so arranged that the knives on one roller cut the flaps on one end of the section while the knives on the adjoining rollers cut the flaps on the adjacent end of the adjoining section.

The cutter-carrying rollers 12 are made to revolve with the former, preferably by means of connections with the pressers, or presser-carrying-frame, to be hereinafter described, and are also rotated on their own axes at the same time in order to operate the knives at predetermined intervals. For this purpose they are mounted in suitable bearings 16 in a rotatable frame 17 which has bearings between uprights 18, 18'.

19 indicates a connection with a driven part of the apparatus. Preferably such connection comprises a sleeve removably secured at one end to the presser-carrying frame by bolts 19' and at its opposite end to the cutter-carrying frame by similar bolts, whereby the latter frame is rotated by the presser-carrying frame with the former 2. The bolts 19' also permit the frame 17 and frame 7 to be adjusted angularly about the axis of the mandrel relative to each other.

20 indicates a shaft mounted in bearings carried by the presser-carrying frame and the cutter-carrying frame and movable therewith.

21 indicates a gear fixed to the shaft 20. 22' indicates a shaft for one of the pressers 6 and 22 indicates a gear carried thereby meshing with the gear 21, whereby the rotary movement of the pressers 6 is transmitted to the shaft 20. 23 indicates another gear fixed to the shaft 20 and arranged adjacent to the cutting mechanism.

25 indicates the shaft or axle for one of the rolls 12 and 24 indicates a gear fixed thereto and arranged to mesh with the gear 23, such gearing operating to rotate said roller 12 on its own axis during its revolution with the former 2. Suitable connections are provided between the driven roller 12 and the remaining rollers, whereby each knife is caused to operate at predetermined intervals. The rollers 12 are preferably arranged in the same plane extending transversely of the former and the connections between them may comprise cogs 26 arranged at the opposite ends of each roller, the cogs of one roller meshing with the cogs 26 of adjoining rollers 12. It will thus be seen that the motion communicated from the shaft 20 to one roller will be transmitted to all the others, and that in the preferred form of the invention just described the knives operate simultaneously on all sides of the tube.

Springs 27 in the frame 17 bear against the journals for the cutting rolls in order that they may yield slightly.

The cutter-carrying rolls and the rotating frame therefor are all removable and new rolls or rolls of different sizes may be substituted; further, the number of rolls may be increased or diminished according to the shape of the tube winding mechanism in the same manner as the pressers may be changed, as fully set forth in the aforesaid application.

We have illustrated in Figs. 3 and 4 a series of cutter-carrying rolls provided with two sets of cutting knives adapted to sever the tube with one form of flap at one end and with another form of flap at the other end of each section. It will be understood that we may provide knives for cutting flaps of either form at one or both ends of each section as may be desired, or as shown in Fig. 9, we may provide a series of rollers 12$^b$ carrying knives for cutting flaps at one and a separate series of rollers 12$^b$ carrying knives for cutting a different form of flap at the opposite end of each section.

It is desirable in some instances to form at one or both ends of each box section or blank a seat for a disk or cap which fits into the end of the blank and forms a closure therefor. This seat is formed by slightly constricting the box near its end.

One form of mechanism for constricting a box is shown in Figs. 1, 2 and 6. In these figures 27, 27, indicate a series of rolls surrounding the former 2 and adapted to revolve therewith. These rolls are mounted in a frame 28 which rotates between uprights 29, 29', adjustably mounted on the bed A. The frame 28 is rotated in unison with the former 2 through some suitable connection with a driven part of the machine, but preferably by means of a sleeve 30 with the adjacent mechanism. Each roll 27 is provided with one or more constricting devices 31, 31, which coöperate with a reduced portion 32, formed at the free end of the former 2. All of the rolls 27 rotate together on their axes simultaneously during their revolution with the former. This motion is preferably communicated to the rolls 27 by extending the shaft 20, as shown at 20', to the frame 28 and mounting thereon a gear 33 adapted to mesh with a gear 34 connected with one of the constricting rolls. By means of cogs or teeth 35 carried by each of said rolls and engaging with each other, all of the rolls will be driven in unison so that the constricting devices will operate on all sides of the box at the same time. When the tube sections are provided with closing flaps at one or both ends, the ribs 31 may serve to depress or bend the flaps slightly inwardly and thus result in weakening the tube sections on transverse lines. After the tube sections are removed from the mandrel, the flaps can then be readily folded down, one on the other to close the open end of the section.

We have illustrated in Figs. 7 and 8 another form of mechanism for constricting the box. 37, 37, indicate oscillating members, pivotally mounted in blocks 38 at the free end of the mandrel 2 and arranged parallel with its opposite sides. Each of these members is normally held in the position shown in Fig. 7 by a spring 39, mounted in a recess 40, formed in the former or mandrel, which spring engages a collar 41 fixed to a rod 42, the outer end of which is slidably connected with one of the oscillating members at 43. 44, 44, indicate a series of rotating constricting rolls, mounted and operated similar to the rolls 27, provided with constricting devices 45, that coöperate with longitudinal grooves or recesses 46 formed in the oscillating members 37. During the rotation of the constricting rolls 44 the constricting devices 45 engage the members 37 by projecting into the grooves 46 thereof and move them on their axes into the position shown in dotted lines, Fig. 7.

As soon as the constricting devices 45 leave the grooves 46, the members 37 are free to move back into normal position. As the box blanks are fed along the mandrel 2 and between the constricting devices or ribs 45 and the oscillating members 37, the box blank will be pressed into the grooves 46 by the ribs 45 and thereby constricted.

Fig. 10 illustrates a modified form of the invention comprising knives 48, 49, for severing a tube with flaps on each section and constricting ribs 50, 50, all combined upon a single roll 47. By using a series of rolls 47 in place of the cutters 12 and constricting rolls 44, the number of parts of the apparatus is reduced.

Combined with the machine is mechanism for printing one or more sides of each box blank or flaps in any manner desirable. The printing means are preferably mounted between the cutting and constricting mechanisms, but they may be arranged between other mechanisms or at the end of the machine. We have shown only one printing mechanism adapted to print or emboss the several sides of the boxes, but if desired the machine may be adapted to more than one printing mechanism, particularly in cases where different colors of printing and embossing are to be placed on the boxes.

Referring to Figs. 1, 1ª and 2, 54 indicates a frame rotatably mounted between uprights 55, 55. The frame 54 carries a series of rolls 56 on which are mounted printing devices 56ª for printing and embossing the several surfaces of the box blanks or flaps in any manner desired. The rolls 56 are mounted in journal bearings and preferably geared together, for instance by gears 57. The frame 54 is preferably connected to the cutter-carrying frame 17 as by a removable sleeve or tube 58 and rotates therewith, and with the mandrel. During the revolution of the printing rolls with the mandrel 2, they rotate on their own axes to bring the printing devices into operative position. The rotation may be imparted to the printing rolls by reason of their contact or engagement with the box blank moving longitudinally of the mandrel 2. But I prefer to rotate them positively to prevent slipping and insure better printing effects. For this purpose I provide a gear 59, carried by one of the rolls, and which may mesh with a gear 60, secured to the shaft 20. 61, 61 indicate inking pads, rotatably mounted on the frame 54 and arranged to engage with the printing devices to ink them. The printing rolls and the rotating frame therefor are preferably constructed similar to the pressers 6, whereby they may be removed and others substituted to suit different forms and sizes of boxes or tubes which are to be made. The journals of the printing rolls are preferably provided with springs 56' in order to press the rolls against the box blanks to form a proper contact of the printing devices therewith.

51, 51, indicate longitudinal slots formed in the bed A of the machine to receive bolts 52 for adjustably securing the uprights 8—8', 18—18', 55—55, 29—29', for the frames 7, 17, 54 and 28, respectively, in position thereon. 53 indicates tie-rods for securing the several pairs of uprights together. By this construction, each pair of uprights may be moved along the bed A, thereby adjusting the presser mechanism, the cutting mechanism, the printing mechanism and the constricting mechanism, relative to each other and longitudinally of the former, when desired.

It will be seen by the foregoing description that our apparatus comprises a tube forming and feeding mechanism, a cutting or severing mechanism, a printing mechanism and a constricting mechanism, all constructed and adapted to form or make a complete article. As all the several parts of the apparatus are removable, any one mechanism can be operated without the others, or any two or more combined and operated together to suit different conditions as may be found desirable.

It will be understood that the printing mechanism herein shown and described comprises one form of such mechanism. Other means may be provided for printing on the sides of the tube or box blanks as desired.

By means of the sleeves and bolts 19' for uniting the several mechanisms, each one may be adjusted axially independently of and relative to the other; and when they are adjusted toward and from each other, new sleeves may be substituted.

As the mandrel 2 and pressers 6 revolve in unison about the axis of the mandrel, and the gear 11 meshing with the stationary rack operates to rotate the pressers 6 on their own axes during such revoluble movement, it will be apparent that the speed at which the pressers rotate is governed by the speed of the pressers and former around the axis of the latter. Under these conditions, in case the speed at which these parts revolve changes to a higher or lower rate, the pressers 6 will be rotated automatically faster or slower, as the case may be, and thus feed the tube along the former according to its speed of rotation. Furthermore, since the cutting mechanism, the printing mechanism and the constricting mechanism are connected with and operated by the tube forming and feeding devices, the speed of revolution of the latter will automatically control the operations of each of these mechanisms.

What we claim is:

1. In a box making machine, the combination of a rotatable mandrel, means for rotating said mandrel, means for forming a tube thereon and feeding it longitudinally thereof, and severing knives revoluble with the mandrel for severing the tube into box sections, the said knives being arranged to cut the tube on a single irregular line extending around the tube, whereby closing flaps are formed on adjacent ends of adjoining sections.

2. In a box making machine, the combination of a rotatable polygonal mandrel, means for rotating said mandrel, means for forming a polygonal tube thereon and feeding it longitudinally along said mandrel, and severing devices, one for each side of the tube, coöperating with each other to cut the tube into sections, each section being cut from the tube along a single irregular line, whereby closing flaps are formed upon the adjacent ends of adjoining box sections.

3. In a box making machine, the combination of mechanism for forming a tube, including a rotatable mandrel, means for rotating the mandrel, and a series of cutters, revoluble with the mandrel for cutting the tube into sections, each section being cut from the tube along a line which forms a series of projections on one end of the severed section and on the adjacent end of the adjoining section arranged to serve as end closures for the sections.

4. In a machine of the character described, the combination of mechanism for forming a tube, a series of substantially V-shaped cutters coöperating with each other for cutting the tube into sections along a line which forms a series of projections on one end thereof and a series of depressions similar in shape to said projections on the adjacent end of the adjoining section, and means for operating said cutters.

5. In a box making machine, the combination of mechanism for forming a tube, and a series of cutting devices for cutting the tube into sections, each device comprising two knives and one of said knives being arranged to cut the tube in a longitudinal direction and the other of said knives being arranged to cut the tube on a line extending from one end of said longitudinal cut to the opposite end of an adjoining longitudinal cut.

6. In a box making machine, the combination of mechanism for forming a polygonal tube, and a series of cutting devices, one for each side of the tube, for cutting the tube into sections, each device comprising two knives and one of said knives being arranged to cut the tube longitudinally along the adjacent corner or edge thereof and the other for said knives being arranged to cut the tube on a line extending from one end of said longitudinal cut to the opposite end of an adjoining longitudinal cut.

7. In a machine of the class described the combination of means for forming a tube, and sets of cutting devices for cutting the tube into sections, the said sets being arranged to operate alternately and to cut the tube on different lines, whereby one end of each section is cut different from its opposite end.

8. In a box making machine, the combination of mechanism for forming a tube, and sets of cutting devices for cutting the tube into sections, the said sets being arranged to operate alternately, and one of said sets being arranged to cut the tube on a line which forms a series of projections on one end of a section and a series of depressions similar in shape to said projections on the adjacent end of the adjoining section.

9. In a box making machine, the combination of a series of pressers, a former, means for supplying a strip of material to the pressers and former, means for rotating the former, means for feeding the tube formed by the pressers along the former, a series of cutters for severing the tube into sections, and connections between the pressers and the cutters for revolving the said cutters with the former.

10. The combination of a series of revoluble pressers, a rotatable former extending between the pressers, means for feeding a strip of material to the former and pressers, means for driving the former and pressers, cutters for severing the tubes into box blanks, and connections between the cutters and the pressers for operating the cutters.

11. The combination of a rotatable former, a rotatable presser-supporting frame, rotatable pressers mounted therein, a rotatable cutter supporting frame, rotatable cutters supported in the said frame, the former being of a length to extend between the pressers and the cutters, means for revolving the pressers and cutters around the longitudinal axis of the former, means for rotating the pressers on their own axes, and connections between the pressers and the cutters for rotating the cutters on their own axes.

12. The combination of a rotatable former, a series of rotatable pressers and a series of rotatable cutters, the cutters and pressers being revoluble around the longitudinal axis of the said former, means for rotating the pressers on their own axes, and connections between the pressers and the cutters for rotating the cutters on their own axes.

13. The combination of a mandrel, means for feeding a tube along said mandrel, and a series of cutters for severing the tube into sections, each cutter comprising a diagonal knife and a longitudinal knife, whereby the tube is cut into sections with flaps simultaneously formed on the adjacent ends of adjoining sections.

14. The combination of a rotatable former, means for rotating said former, means for forming a tube on the former, a series of rollers revoluble with the former, a diagonal and a longitudinal knife carried by each roller, and means for rotating the said rollers.

15. The combination of a rotatable former, means revoluble with the former for forming a tube thereon, means for driving the former and tube forming means, cutting mechanism for severing the tube into sections or blanks, and means for constricting each section or blank near one end thereof.

16. The combination of a rotatable former, means revoluble with the former for forming a tube thereon, means for driving the former, cutting mechanism for severing the tube into sections or blanks, means for constricting each section or blank near one end thereof, and means for revolving the constricting means with the former.

17. The combination of tube feeding means, cutters for severing the tube into sections or blanks, and means for constricting each blank near one end thereof.

18. The combination of feeding means for a polygonal tube, cutters for severing the tube into sections or blanks, and means for depressing each wall of each section or blank.

19. The combination of tube feeding means, cutters for severing the tube into sections or blanks, a series of rollers each formed with a rib, and means for rotating the said rollers to cause the ribs to engage the tube blanks near one end thereof.

20. The combination of a mandrel supported at one end and having its free end reduced, means for feeding a tube along said mandrel, means for severing the tube into sections or blanks, and means, coöperating with the reduced end of the mandrel, for constricting each section or blank near one end thereof.

21. The combination of a mandrel supported at one end, the free end of said mandrel being reduced, means for feeding a tube along said mandrel toward its free end, means for severing the tube into sections with closing flaps at one end thereof, and devices, each formed with a rib, coöperating with the reduced end of the mandrel for depressing each section on transverse lines.

22. The combination of a mandrel, means for feeding a tube along said mandrel, a set of cutting devices for severing the tube into sections with flaps formed on adjoining ends thereof, and another set of cutting devices for severing the tube with flaps formed on adjoining ends of sections, the said sets of cutting devices operating alternately, whereby each section is cut at one end by one set of cutters and at its opposite end by the other set of cutters.

23. The combination of a mandrel, devices revoluble around the axis of the mandrel and coöperating therewith to form a tube and feed it along the mandrel, the feeding of the tube being controlled by the speed of revolution of the said devices, mechanism for operating on said tube, and driving connections between the said devices and said mechanism for operating and controlling the latter.

24. The combination of a rotatable mandrel, means, revoluble with the mandrel, for forming a tube thereon and for feeding the tube longitudinally of the mandrel, means, revoluble with the mandrel, for printing on one surface of the tube, and means for rotating the said mandrel.

25. The combination of a mandrel, means for forming a tube on said mandrel and for feeding it longitudinally thereof, means for severing the tube into box blanks, and mechanism for printing one surface of the tube, the said printing mechanism being revoluble around the longitudinal axis of the mandrel.

26. The combination of a mandrel, means for feeding a tube along the mandrel, means for severing the tube into box blanks, printing mechanism for embossing or printing one or more surfaces of the box blanks, and means for constricting one end of the said box blanks.

27. The combination of a rotatable mandrel, means for rotating the mandrel, means for forming and feeding a tube along the mandrel, means for printing one or more surfaces of the tube, and connections with the tube forming and feeding means for operating the printing means.

28. The combination of a rotatable former, means for rotating the former, pressers for forming a tube on the former and feeding it along the former, means for severing the tube into sections or box blanks, means for printing one or more surfaces of the tube, and means for connecting the printing means, the cutting means and pressers together.

29. The combination of a rotatable former, a frame, a series of rotatable pressers mounted in the said frame and arranged to form a tube on the former, means for rotating the former and presser-carrying frame, means for rotating the pressers on their own axes, a second frame connected with the presser-carrying frame, printing devices movably mounted in the last mentioned frame, and means connected with the presser means for operating the said printing devices.

30. The combination of a rotatable mandrel, means rotating with the mandrel for feeding a tube along the mandrel, and a device revoluble with the mandrel for printing one surface of the tube.

31. The combination of a rotatable mandrel, means rotating with the mandrel for feeding a tube along the mandrel, devices revoluble with the mandrel for printing one or more surfaces of the tube, and inking means for the printing devices.

32. The combination of a rotatable mandrel, means rotating with the mandrel for feeding a tube along the mandrel, a frame rotatable with the mandrel, and means carried by the frame for printing one or more surfaces of the tube.

33. In a machine of the character described, the combination of a rotatable polygonally shaped former, pressers revoluble with the former and engaging with each surface of the former for forming a tube thereon, means for supplying a strip to the former and pressers, and a device movable in unison with the mandrel around its longitudinal axis and arranged relative to one surface of the formed tube for printing or embossing it.

34. In a machine of the character described, the combination of a rotatable polygonally shaped former, pressers engaging with each surface of the former for forming a tube thereon and feeding it along the former, means for supplying a strip to the former and pressers, and a printing device, arranged adjacent to one surface of the formed tube and revoluble with the former, for printing or embossing the tube.

35. In a tube making machine, the combination of means for forming a spirally wound tube, the said means comprising a rotatable former, strip supply devices and pressers coöperating with the former to wind a tube thereon, and means, revoluble with the former, for printing portions of the outer surface of the formed tube.

36. The combination of a former, means for forming a tube thereon, means for severing the tube into sections, means for printing the tube, and means for constricting the tube sections at one or both ends.

37. The combination of a rotatable former, a rotatable frame provided with rotatable pressers, means for feeding a strip of flexible material between the former and pressers, means for driving the former and pressers, another rotatable frame carrying a series of cutters, a third rotatable frame provided with a printing device, means for rotating the cutter-carrying frame and printing frame with the former, a shaft in gear with the pressers extending through all of the said frames, and means connected with the said shaft, for operating the cutters and the printing device.

38. The combination of a rotatable former, a rotatable frame provided with rotatable pressers, means for feeding a strip of flexible material between the former and pressers, means for driving the former and pressers, another rotatable frame carrying a series of cutters, a third rotatable frame provided with a printing device, means for rotating the cutter-carrying frame and printing frame with the former, a shaft in gear with the pressers extending through all of the said frames, and movable therewith.

39. In a tube making machine, the combination of means for forming a spirally wound tube, the said means comprising a rotatable former, strip supply devices and pressers coöperating with the former to wind a tube thereon, means revoluble with the former for printing portions of the outer surface of the formed tube, and connections between the pressers and the printing means, also revoluble with the former, for operating the said printing means.

40. The combination of a bed, tube forming means, means for severing the tube formed by the tube forming means into sections, means for constricting the cut sections, and means permitting the adjustment of the tube forming means, the cutting means and the constricting means relative to each other along the bed.

41. The combination of a bed, tube forming means, means for severing the tube formed by said tube forming means into sections, means for constricting one end of the cut sections, mechanism for printing a surface of a section, and means permitting the adjustment of the printing mechanism along the bed relative to the tube forming means.

42. The combination of a bed, means for forming a tube, means for severing the formed tube into sections, means for constricting one or both ends of the sections, and means permitting the adjustment of the constricting mechanism along the bed relative to the severing mechanism.

43. The combination with a bed formed with a slot extending longitudinally thereof, a mandrel rotatably mounted on said bed, means for forming a tube on the mandrel, means for severing the tube into sections, separate supports for the tube forming means and the severing means mounted on said bed, detachable connections between the tube forming means and the severing means, and devices extending through the slot in the bed for securing each of said supports thereto and permitting their independent adjustment along the bed in either direction.

44. The combination of a bed, a mandrel rotatably mounted on said bed, means revoluble with the mandrel for feeding a tube along said mandrel, means also revoluble with the mandrel for printing a surface of the tube, and means permitting the bodily adjustment of the printing means relative to the tube feeding means.

45. The combination of a bed, a mandrel rotatably mounted thereon, means for forming and feeding a tube along said mandrel, means for severing the tube into sections, means for printing a surface of the tube, the said forming and feeding means, the severing means and the printing means being each revoluble with the mandrel, and means permitting the independent and bodily adjustment of the tube feeding means, the severing means, and the printing means longitudinally of the mandrel.

46. The combination of a mandrel rotatably supported at one end, means revoluble with the mandrel and coöperating therewith for forming a tube thereon and feeding the formed tube toward the free end of the mandrel, means for severing the tube into sections, means for printing on portions of one surface of the tube or tube sections, the said printing means being revoluble with the mandrel and arranged between its opposite ends, and means for rotating the said mandrel.

47. In a machine of the character described, the combination of a rotatable mandrel, means for rotating said mandrel, a pair of frames surrounding said mandrel and mounted to rotate about the axis thereof, devices carried by one of said frames coöperating with the mandrel to form a tube thereon, mechanism carried by the other frame for operating on said formed tube, and a sleeve member surrounding the mandrel and tube and detachably connected at its opposite ends to the rotatable frames, whereby the frames are rotated together.

48. In a machine of the character described, the combination of a rotatable mandrel, means for rotating said mandrel, a pair of frames surrounding the mandrel and mounted to rotate about the axis thereof, devices carried by one of said frames coöperating with the mandrel to form a tube thereon, mechanism carried by the other frame for operating on said formed tube, means connecting said rotatable frames together, and a shaft and gear connections between the tube forming devices and said mechanism for operating the latter.

49. The combination of means for spirally winding strips into a tube including a rotatable mandrel, means revoluble with the mandrel for printing on the surface of the tube formed by the said strip winding means, and means permitting the adjustment of one of the said means toward and from the other means.

50. In a machine of the class described, the combination of a mandrel, means for supporting the mandrel at one end, means for continuously feeding to and winding a strip of paper spirally on said mandrel to form a tube, mechanism including a device arranged adjacent to one face of the formed tube and movable around the axis of the mandrel for printing on the surface of the formed tube.

51. The combination of a rotatable mandrel, means for forming a tube on the mandrel and rotatable therewith, means revoluble with the said mandrel for printing on the surface of the tube formed by the tube forming means, and connections between the tube forming means and the printing means for operating the latter, the said connections being detachable to permit their separation or adjustment one relative to the other.

52. The combination of a rotatable mandrel, means for forming a tube on the said mandrel, means for rotating the mandrel and tube forming means, means for severing the formed tube into sections, and means permitting the adjustment of one of the said means angularly about the axis of the mandrel.

53. In a box making machine, the combination of a mandrel, means for feeding a tube longitudinally of the mandrel, and a series of substantially V-shaped cutters coöperating with the surface of the mandrel for severing the tube into sections with flaps on the ends of adjoining sections without waste of material.

54. The combination of a rotatable mandrel, means for rotating said mandrel, devices coöperating with mandrel for forming a tube thereon, and a single set of knives arranged intermediate the ends of the mandrel and coöperating one with another for severing the tube into sections with closing flaps on the adjacent ends of adjoining sections.

55. In a box making machine, the combination of a mandrel, means for supporting the said mandrel at one end, means for forming a tube on the mandrel and feeding it toward its free end, and a single set of knives or cutters, each comprising a longitudinal knife and a diagonal knife, arranged intermediate the ends of the mandrel for severing the tube into sections with flaps on the ends of adjoining sections.

MARK R. WOODWARD.
ELMER G. DEAN.

Witnesses to the signature of Mark R. Woodward:
  GEO. B. PITTS,
  H. WHYTE.

Witnesses to the signature of Elmer G. Dean:
  GEO. L. FUCHS,
  L. A. BOORE, Jr.